United States Patent Office 3,577,253
Patented May 4, 1971

3,577,253
TITANIUM DIOXIDE PIGMENT COMPOSITION
Warren M. Foss, Metuchen, N.J., assignor to National Lead Company, New York, N.Y.
No Drawing. Filed Aug. 28, 1968, Ser. No. 755,776
Int. Cl. C09c 1/36, 3/02; C09d 5/02
U.S. Cl. 106—300                    4 Claims

ABSTRACT OF THE DISCLOSURE

This invention describes a new type of titanium dioxide pigment composition which is vastly superior to any of the prior art pigments when used in acrylic systems, such as thermosetting or thermoplastic acrylic automotive finishes and exterior acrylic latex paints. The new titanium dioxide pigment composition is finely divided $TiO_2$ pigment particles containing a calcined coating of $$SiO_2\text{-}Al_2O_3\text{-}Na_2O$$

composition in which the ratio of $SiO_2$ to $Al_2O_3$ is 3–8 to 1 and the ratio of $SiO_2$ to $Na_2O$ is 5–20 to 1. The amount of coating is from 5% to 12%. A method for the preparation of this pigment composition is also described. The $SiO_2\text{-}Al_2O_3\text{-}Na_2O$ composition is precipitated onto the surface of the pigment at pH 3.5–6.5 and after adjusting the pH to 7.0–8.5 the coated $TiO_2$ pigment is calcined at 700–825° C.

BACKGROUND OF THE INVENTION

The prior art describes many types of titanium dioxide pigments which are employed for a variety of uses. Excellent pigments have been produced for various systems, e.g. oil systems, such as linseed oil, and resin systems, such as alkyd systems.

These prior are pigments have been produced to impart high opacity, good gloss, high chalk resistance and other desirable properties to these systems for the particular purposes desired.

Such prior art pigments however are not outstanding when employed in acrylic systems.

SUMMARY OF THE INVENTION

The instant invention provides a new pigment composition, capable of imparting superior hiding properties coupled with excellent chalk resistance when employed in acrylic systems, comprising finely divided $TiO_2$ particles containing a calcined coating of $SiO_2\text{-}Al_2O_3\text{-}Na_2O$ composition on said particles in which the ratio of $SiO_2$ to $Al_2O_3$ is 3–8 to 1 and the ratio of $SiO_2$ to $Na_2O$ is 5–20 to 1, the amount of said coating being from 5% to 12% of the weight of said $TiO_2$, said pigment composition prepared by intensely milling a calcined $TiO_2$ having the crystal structure of rutile, precipitating onto the surface of the intensely milled $TiO_2$ calcine the aforesaid $$SiO_2\text{-}Al_2O_3\text{-}Na_2O$$

composition while maintaining the pH within the range of from 3.5–6.5 and after adjusting the pH of the coated $TiO_2$ particles to 7.0–8.5, calcining the coated particles at a temperature of from 700° C. to 825° C. to form said calcined coating composition on the surface of said $TiO_2$ particles and milling said calcined coated $TiO_2$ particles.

The pigment composition of the instant invention exhibits desirable properties when used in oil or alkyed resin systems but the results are not outstanding. It has been found however that this particular $TiO_2$ composition when used in acrylic systems produces outstanding properties such as hiding power, high gloss retention and high resistance to chalking. This combination of pigment properties is vastly superior to any other prior art pigment when used in acrylic systems.

DESCRIPTION OF THE PREFERRED EMBODIMENT

The starting material for the preparation of the pigment composition of the instant invention is a finely divided calcined $TiO_2$ pigment. Such a pigment may be the finely divided raw or unprocessed $TiO_2$ material produced by the vapor phase reaction of $TiCl_4$ with oxygen, or a raw vapor phase $TiO_2$ which has been calcined to remove the chlorine values; or the pigment may be derived from a titanium hydrate which has been hydrolyzed from a titanium sulfate-ferrous sulfate solution, the titanium hydrate being washed and bleached to remove substantially all of the iron values. This titanium hydrate may then be treated with a small amount of $K_2O$, $P_2O_5$ and a rutile sol and then calcined to form a rutile $TiO_2$ product having a high spectral characteristic.

This calcined rutile $TiO_2$ is then milled intensely, preferably steam micronized at a steam to pigment ratio of at least 5:1 to as high as 10:1, and then coated with the aforesaid $SiO_2\text{-}Al_2O_3\text{-}Na_2O$ precipitate. The coated pigment is then heat treated to form the calcined coating on the pigment particles.

It has been discovered that the amounts of silica, alumina, and soda and the techniques of precipitation onto the surface of the pigment are critical in order to form the calcined coating composition of the instant invention on the surface of the pigment particles. These particular coatings are formed on the $TiO_2$ particles when the $SiO_2$ and $Al_2O_3$ values are precipitated on to the pigment while maintaining the pH in the range of from 3.5 to 6.5 and when the ratio of $SiO_2$ to $Al_2O_3$ is 3–8 to 1 and the $SiO_2$ to $Na_2O$ is 5–20 to 1. Compositions which lie outside these ranges do not form the desired calcined coatings on the surface of the pigment particles when calcined at temperatures from 700° C. to 825° C.

If the desired pigment particles are heated above 850° C., the pigment loses some of its desirable optical properties; while heating below 700° C. results in inferior durability properties.

The pigment composition of the instant invention which contains the desired calcined coating on the pigment particles possesses superior properties when employed in acrylic systems. Exceptionally high hiding power as measured as percent green reflectance is obtained along with superior spectral characteristics and chalk resistance.

When the pigment composition of the instant invention is used in a thermosetting or thermoplastic acrylic for automotive finishes and the like, the properties of the pigment composition are determined as follows:

A thermosetting acrylic paint was prepared by thoroughly mixing the pigment sample with a thermosetting acrylic resin (Rohm & Haas–AT–56) and a melamine formaldehyde resin (Rohm & Haas–Uformite MM–47), at 15 P.V.C. with a ratio of acrylic to melamine of 70 to 30. 0.4% of carbon black was also added to the paint formulation, the percentage being based on the weight of the $TiO_2$ used.

The paint was then sprayed onto an aluminum panel (two coats) air dried for 20 minutes and then baked for 17 minutes at 130° C.

The paint panels were then measured for gloss at 20° and 60° on a Gardner gloss meter P–54 Gardner Laboratory, Inc., Bethesda, Md.

The green, red and blue reflectance values of the paint panel were measured on a Colormaster Differential Colorimeter, manufactured by Manufacturers Engineering and Equipment Corp., Hatboro, Pa.

The green reflectance values of the pigment samples employed expressed in percent were taken as a measurement of hiding power and these values were compared with the green reflectance values of competitive TiO₂ pigments. The blue minus red reflectance values were taken as a measure of the color tone or spectral characteristics of the pigment samples. These values were also compared with the values obtained for a competitive pigment, hereinafter referred to as a control pigment, presently in use in acrylic paint systems.

The panels were then exposed for outdoor weathering in a semi tropical atmosphere and the gloss measurements taken every four (4) weeks until the 20° gloss figure was 8 or less. These periods of time were recorded as the chalk resistance of the paint panels.

The following test was used to determine the properties of the pigment composition when the pigment was used in an exterior acrylic latex paint.

The acrylic latex paint was prepared as follows:

50 grams of the TiO₂ pigment samples were ground into a composite containing 50 grams asbestine 3X, 1.1 grams of lampblack, 57.5 grams of water and small quantities of a dispersing agent and a surfactant. After thoroughly grinding this mixture, 113.5 g. of an acrylic emulsion (Rohm & Haas—Rhoplex–AC–35) were added to obtain a finished paint at 40 P.V.C.

The paint was then brushed onto a wooden panel (two coats) and air dried for 48 hours after each coat.

The green, red and blue reflectance values were determined as previously described and the results were compared against a competitive TiO₂ pigment used as a control.

The following examples are presented to show further the details of the instant invention.

EXAMPLE 1

In this example a bleached and washed titanium hydrate was treated with 0.2% K₂O, 0.1% P₂O₅ and 2.0% of a rutile sol, and the treated hydrate was calcined at 900° C. to convert the TiO₂ to the rutile structure. The calcined TiO₂ was steam milled at a steam to pigment ratio of 10:1 to produce a finely divided TiO₂ pigment.

The ground TiO₂ pigment was then slurried and dispersed in water at 20% solids at 60° C. The pH of the pigment slurry was adjusted to 5.5 by the addition of H₂SO₄. An N-Brand sodium silicate solution containing 60 g.p.l. SiO₂ was then added to the slurry along with a solution of H₂SO₄ in order to keep the pH constant at 5.5. The amount of SiO₂ added was 6% on a TiO₂ basis. A solution of Al₂(SO₄)₃ containing 50 g.p.l. Al₂O₃ was then added along with a solution of NaOH, 100 g.p.l., to maintain the pH at 5.5. The amount of Al₂O₃ added was 1% on a TiO₂ basis. After the Al₂(SO₄)₃ was added, the pH of the treated slurry was raised to 7.5 by the addition of NaOH. The treated TiO₂ in the slurry was then filtered and washed to remove the soluble sodium sulfate. After drying the treated pigment was then calcined at 825° C. for 2 hours to form the desirable calcined coating on the surface of the pigment. The coated TiO₂ pigment contained 6% SiO₂, 1% Al₂O₃ and 0.5% Na₂O. The treated pigment containing the calcined coating was then steam milled to produce the finished pigment material.

When this finished pigment was milled and incorporated into a thermosetting acrylic paint system, this paint system had a green reflectance value of 33.0% (which is a 16.9% improvement over a comparable system containing a competitive TiO₂ pigment presently used in thermosetting acrylics), a spectral characteristic of +3.0, an initial 20° gloss value of 76 and a chalk resistance of 93 weeks (20 weeks more than the standard pigment). The results are recorded in Table 1.

EXAMPLES 2–3

In these runs the procedure of Example 1 was repeated except that various amounts of sodium silicate and aluminum sulfate were employed. In Example 2 the ratio of SiO₂ to Al₂O₃ was 4 to 1 while in Example 3 the ratio wax 8 to 1. In both cases the desirable calcined coating formed on the pigment particles.

When these pigment compositions were employed in a thermosetting acrylic paint system superior paint properties were obtained.

The results along with those of Example 1 are recorded in Table 1.

EXAMPLES 4–6

These examples are presented to show the effect of forming coatings on a milled rutile TiO₂ pigment using various amounts of SiO₂, Al₂O₃ and Na₂O in ratios which lie outside the ranges specified in the instant invention. Also the coatings were precipitated onto the pigment using the normal prior art procedure which does not maintain the pH within the range of 3.5–6.5 during the precipitation of the SiO₂ and Al₂O₃ values. The amounts of agents employed and the results obtained are recorded also in the following table. In each of these examples the calcined coatings formed on the surface of the pigment particles did not have the desirable composition. In addition when these pigments were incorporated in thermosetting acrylic paint systems, inferior optical properties were obtained.

TABLE 1

[Properties of titanium dioxide pigment composition in thermosetting acrylic systems]

|  | Example | | | | | | Control pigment |
|---|---|---|---|---|---|---|---|
|  | 1 | 2 | 3 | 4 | 5 | 6 |  |
| Coating composition, percent: |  |  |  |  |  |  |  |
| SiO₂ | 6.0 | 4.0 | 8.0 | 4 | 6 | 1 | 2.0% SiO₂ |
| Al₂O₃ | 1.0 | 1.0 | 1.0 | 3 | 3 | 1 | 3.0% Al₂O₃ |
| Na₂O | 0.5 | 0.3 | 0.5 | 0.3 | 0.6 | 0.3 | 0.5% TiO₂ |
| Properties: |  |  |  |  |  |  |  |
| Percent green reflectance | 33.9 | 35.6 | 34.1 | 26.9 | 26.9 | 29.4 | 29.0 |
| Percent improvement over control pigment | +16.9 | +22.8 | +17.6 | −7.2 | −7.2 | +1.2 |  |
| Spectral characteristic | +3.0 | +3.1 | +2.8 | +1.7 | +1.6 | +1.5 | +2.6 |
| Chalk resistance (weeks) | 93 | 78 | 98 | 76 | 84 | 56 | 73 |

In addition to the superior properties obtained when the instant pigment compositions are used in thermosetting acrylic paint systems, it also has been found that vast improvements are obtained when these instant pigment compositions are employed in acrylic latex paint systems and in thermoplastic acrylics.

The pigment compositions of Examples 1–3 were used to prepare exterior acrylic latex paints and the results obtained are recorded in Table 2.

When the pigment compositions of the instant invention are used in acrylic latex paints, the results show that the paint has excellent hiding power or tinting strength as shown by the green reflectance figures coupled with excellent chalk resistance and possesses a good spectral characteristic and color tone.

When the instant pigment compositions are used in acrylic latex paint compositions and compared with paints using prior art types of TiO₂ pigments, the instant acrylic latex paints are superior in hiding power coupled with excellent chalk resistance and high spectral characteristic.

No other prior art $TiO_2$ pigment produces acrylic latex paints having the combination of these superior properties.

TABLE 2

[Properties of titanium dioxide pigment composition in exterior acrylic latex systems]

|  | Example | | |
|---|---|---|---|
| Coating | 1 | 2 | 3 |
| Composition, percent: | | | |
| $SiO_2$ | 6.0 | 4.0 | 8.0 |
| $Al_2O_3$ | 1.0 | 1.0 | 1.0 |
| $Na_2O$ | 0.5 | 0.3 | 0.5 |
| Properties: | | | |
| Percent green reflectance | 37.3 | 37.6 | 37.5 |
| Spectral characteristic | +2.1 | +2.2 | +1.8 |
| Chalk resistance at end of 20 weeks | (1) | (1) | (1) |

[1] Very slight.

It has been clearly shown by the examples presented that superior acrylic paints have been produced (both the acrylic thermosetting and exterior acrylic latex paints) when the pigment compositions of the instant invention are employed.

While this invention has been described and illustrated by the examples shown, it is not intended to be strictly limited thereto, and other variations and modifications may be employed within the scope of the following claims.

What is claimed is:

1. A $TiO_2$ pigment composition capable of imparting superior hiding properties coupled with excellent chalk resistance to acrylic paint systems when employed therein said $TiO_2$ pigment composition comprising finely divided calcined rutile $TiO_2$ pigment particles having a 700° C. to 825° C. calcined coating of $SiO_2$-$Al_2O_3$-$Na_2O$ composition on the surface of said particles wherein the ratio of $SiO_2$ to $Al_2O_3$ is in the range from 3–8 to 1, the ratio of $SiO_2$ to $Na_2O$ is in the range from 5–20 to 1, and the amount of said coating composition is from 5% to 12% by weight of said $TiO_2$.

2. A $TiO_2$ pigment composition according to claim 1 wherein the finely divided calcined rutile $TiO_2$ comprises an intensely milled calcined rutile $TiO_2$.

3. A process for producing a $TiO_2$ pigment composition capable of imparting superior hiding properties coupled with excellent chalk resistance to acrylic paint systems when incorporated therein which process comprises: intensely milling calcined rutile $TiO_2$ pigment particles, forming an aqueous slurry of said intensely milled rutile $TiO_2$ pigment particles, precipitating from said slurry onto the surface of said particles a $SiO_2$-$Al_2O_3$-$Na_2O$ precipitate while maintaining the pH of said slurry within the range of from 3.5–6.5 to coat the $TiO_2$ particles, the ratio of $SiO_2$ to $Al_2O_3$ being in the range from 3–8 to 1, the ratio of $SiO_2$ to $Na_2O$ being in the range from 5–20 to 1, and the amount of said coating being from 5% to 12% of the weight of said $TiO_2$, and after coating the particles raising the pH of said slurry to 7.0–8.5, filtering said slurry to recover the coated $TiO_2$ particles, thereafter calcining the coated $TiO_2$ particles at a temperature of from 700° C. to 825° C. to form a calcined coating on the surface of said $TiO_2$ particles and milling said calcined coated $TiO_2$ particles.

4. A process for producing a $TiO_2$ pigment composition according to claim 3 wherein the calcined rutile $TiO_2$ is intensely milled by steam micronizing at a steam to pigment ratio of from 5:1 to 10:1.

References Cited

UNITED STATES PATENTS 3,035,966   5/1962   Sinta _____ 106—308I
3,409,501   11/1968   Sinta _____ 106—308I TOBIAS E. LEVOW, Primary Examiner H. M. S. SNEED, Assistant Examiner U.S. Cl. X.R.

106—308I; 260—29.6